US012682064B2

(12) United States Patent
Wang

(10) Patent No.: US 12,682,064 B2
(45) Date of Patent: Jul. 14, 2026

(54) METHOD AND APPARATUS FOR COMPILING MIRROR IMAGE, NONVOLATILE READABLE STORAGE MEDIUM, AND ELECTRONIC DEVICE

(71) Applicant: SUZHOU METABRAIN INTELLIGENT TECHNOLOGY CO., LTD., Suzhou (CN)

(72) Inventor: Xuelong Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/122,421

(22) PCT Filed: Sep. 26, 2023

(86) PCT No.: PCT/CN2023/121784
§ 371 (c)(1),
(2) Date: Apr. 18, 2025

(87) PCT Pub. No.: WO2024/148863
PCT Pub. Date: Jul. 18, 2024

(65) Prior Publication Data
US 2026/0010631 A1      Jan. 8, 2026

(30) Foreign Application Priority Data
Jan. 9, 2023    (CN) .......................... 202310029650.8

(51) Int. Cl.
*G06F 21/57*          (2013.01)
*H04L 9/32*           (2006.01)
*H04L 9/40*           (2022.01)

(52) U.S. Cl.
CPC ............ *G06F 21/572* (2013.01); *G06F 21/57* (2013.01); *G06F 2221/033* (2013.01);
(Continued)

(58) Field of Classification Search
CPC ..... G06F 21/57; G06F 21/572; H04L 9/3249; H04L 63/0435; H04L 63/062;
(Continued)

(56) References Cited

U.S. PATENT DOCUMENTS

| | | | |
|---|---|---|---|
| 10,922,413 B2 * | 2/2021 | Mihm | .................... G06F 8/654 |
| 2019/0042752 A1 | 2/2019 | Mihm | |

(Continued)

FOREIGN PATENT DOCUMENTS

| | | |
|---|---|---|
| CN | 105511911 A | 4/2016 |
| CN | 111414169 A | 7/2020 |

(Continued)

OTHER PUBLICATIONS

"Platform Firmware Resiliency Guidelines"—Andrew Regenscheid, Computer Security Division, NIST Special Publication 800-193, May 2018 https://nvlpubs.nist.gov/nistpubs/SpecialPublications/NIST.SP.800-193.pdf (Year: 2018).*

(Continued)

*Primary Examiner* — Randy A Scott
(74) *Attorney, Agent, or Firm* — Scully, Scott, Murphy & Presser, P.C.

(57) ABSTRACT

Provided are a method and apparatus for compiling a mirror image, a nonvolatile readable storage medium, and an electronic device. The method includes: whether a compilation operation of a platform firmware resilience project exists in a compilation script is recognized through a macro definition in a case of compiling a project of a board manager controller, so as to obtain a recognition result; a compilation code configured to generate a PFR mirror image is executed in a case that the recognition result indicates that the compilation operation of the PFR project exists, so as to generate the PFR mirror image; and a data check is per- (Continued)

formed through the PFR mirror image in a case of running each item in the project of the board manager controller.

19 Claims, 3 Drawing Sheets

(52) U.S. Cl.
CPC ........ *H04L 9/3249* (2013.01); *H04L 63/0435* (2013.01); *H04L 63/062* (2013.01); *H04L 63/0823* (2013.01); *H04L 63/126* (2013.01); *H04L 63/1425* (2013.01); *H04L 63/20* (2013.01)

(58) Field of Classification Search
CPC ............... H04L 63/0823; H04L 63/126; H04L 63/1425; H04L 63/20
See application file for complete search history.

(56) References Cited

U.S. PATENT DOCUMENTS

| | | | |
|---|---|---|---|
| 2021/0157921 A1 | 5/2021 | Brown | |
| 2023/0133726 A1* | 5/2023 | Wen ...................... | H04L 9/3247 |
| | | | 713/2 |

FOREIGN PATENT DOCUMENTS

| | | | | | |
|---|---|---|---|---|---|
| CN | 113626803 A | | 11/2021 | | |
| CN | 114116305 A | | 3/2022 | | |
| CN | 114168173 A | * | 3/2022 | ............... | G06F 8/71 |
| CN | 115048655 A | | 9/2022 | | |
| CN | 115098867 A | * | 9/2022 | ............... | G06F 8/65 |
| CN | 115391090 A | | 11/2022 | | |
| CN | 115686558 A | | 2/2023 | | |
| CN | 115756496 A | | 3/2023 | | |
| CN | 116830110 A | | 9/2023 | | |
| WO | 2008125634 A1 | | 10/2008 | | |
| WO | WO-2021143845 A1 | * | 7/2021 | ........... | G06F 3/0643 |

OTHER PUBLICATIONS

"Baseboard Management Controller"—User's Manual Revision 1.0a, Supermicr, Mar. 25, 2022 https://www.supermicro.com/manuals/other/BMC_Users_Guide_X12_H12.pdf (Year: 2022).*

The search report of counterpart CN application No. 202310029650.8 issued on Mar. 9, 2023.

The search report of PCT application No. PCT/CN2023/121784 issued on Dec. 20, 2023.

* cited by examiner

Fig. 2

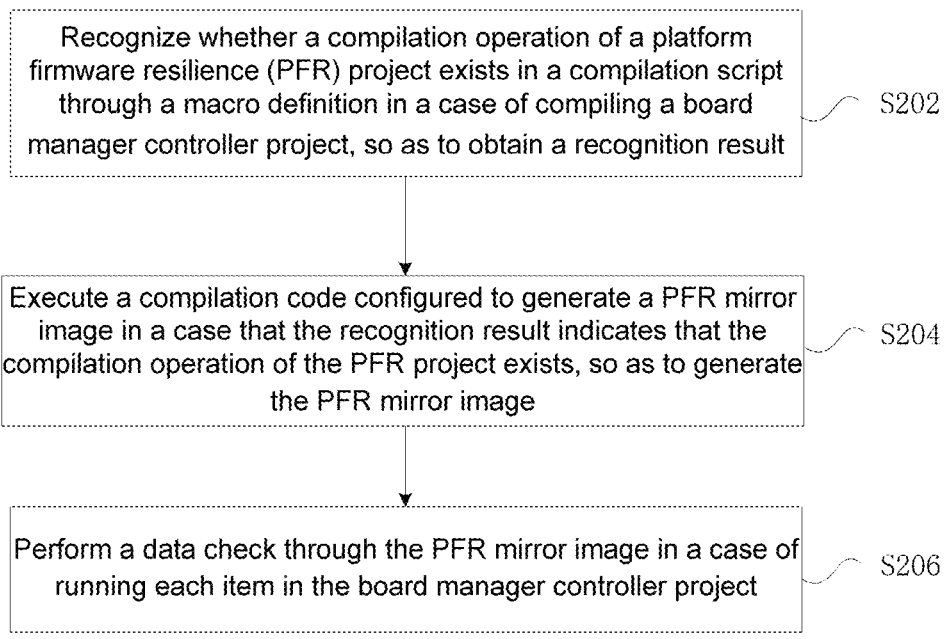

Recognize whether a compilation operation of a platform firmware resilience (PFR) project exists in a compilation script through a macro definition in a case of compiling a board manager controller project, so as to obtain a recognition result          S202

Execute a compilation code configured to generate a PFR mirror image in a case that the recognition result indicates that the compilation operation of the PFR project exists, so as to generate the PFR mirror image          S204

Perform a data check through the PFR mirror image in a case of running each item in the board manager controller project          S206

Fig. 3

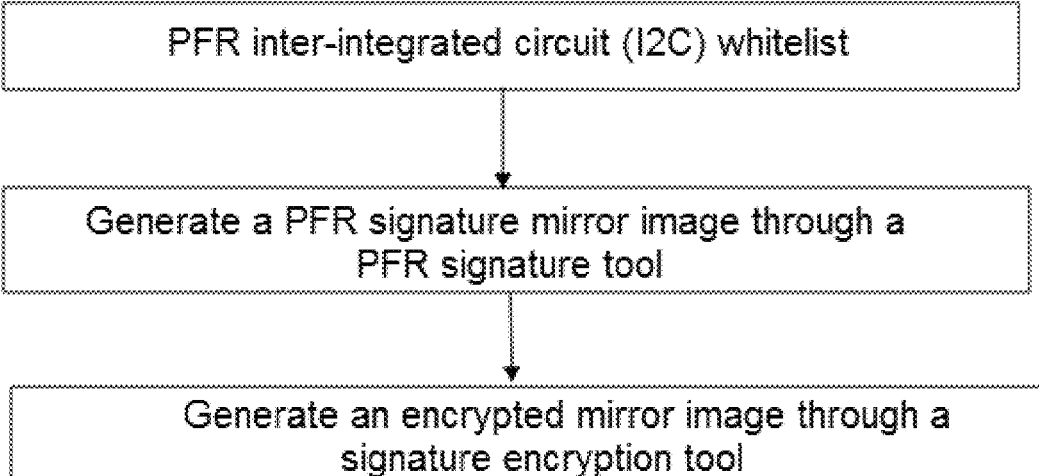

PFR inter-integrated circuit (I2C) whitelist

Generate a PFR signature mirror image through a PFR signature tool

Generate an encrypted mirror image through a signature encryption tool

| PFR file | Item A | Item B | Item C | ... |
|---|---|---|---|---|
| Mirror image offset address | 0x3fc0000 | 0x3fb0000 | 0x3fa0000 | ... |

METHOD AND APPARATUS FOR COMPILING MIRROR IMAGE, NONVOLATILE READABLE STORAGE MEDIUM, AND ELECTRONIC DEVICE

CROSS-REFERENCE TO RELATED APPLICATION

The disclosure claims the priority to Chinese Patent Application No. 202310029650.8, filed with the China National Intellectual Property Administration on Jan. 9, 2023 and entitled "Method and apparatus for compiling mirror image, nonvolatile readable storage medium, and electronic device", which is incorporated in its entirety herein by reference.

TECHNICAL FIELD

The present disclosure relates to the field of computers, and in particular to a method and apparatus for compiling a mirror image, a nonvolatile readable storage medium, and an electronic device.

BACKGROUND

With development in the field of computers, firmware in computer software, underlying codes for connecting hardware and an operating system when the computer is activated, is responsible for the most basic and underlying work of the system. Thus, it is of importance to protect and recover platform firmware. Platform firmware resilience Intel (Intel PFR) is a type of technology for server firmware reliability based on an Intel platform and a type of technology implementable by hardware for ensuring secure and reliable running of a server. The technology is used to protect platform assets, detect malicious or false behaviors such as firmware damage, and recover platform firmware to a desirable state. Compared with a method for protecting platform firmware by relying on security codes and encryption algorithms at a software level only, the technology is securer, stabler, and more reliable.

However, a board manager controller (BMC) needs to establish secure communication with the PFR technology, so that a general technology is combined with the PFR technology to realize an internal system update. Due to a big difference between the general technology and the PFR technology, their code bases are executed independently. In order to update the system, codes of common modules of the general technology are required to be upgraded or modified before the PFR technology is synchronized with codes of a general BMC. In consequence, stability of code branches is affected, and problems in production, test, and subsequent client maintenance are caused because the workload of code maintenance is added, code synchronization is difficult, and function modules are not fully synchronized.

For the problems that it is difficult to generate a PFR mirror image and check the BMC owing to difficulties in unifying compilation codes of the general technology and compilation codes of the PFR technology in the related art, no effective solution has been provided yet.

SUMMARY

A method and apparatus for compiling a mirror image, a nonvolatile readable storage medium, and an electronic device are provided in some embodiments of the disclosure.

A method for compiling a mirror image is provided in a first aspect. The method includes: whether a compilation operation of a PFR project exists in a compilation script is recognized through a macro definition in a case of compiling a project of a board manager controller, so as to obtain a recognition result, where the macro definition is a macro definition in a project configuration item file; a compilation code configured to generate a PFR mirror image is executed in a case that the recognition result indicates that the compilation operation of the PFR project exists, so as to generate the PFR mirror image, where the PFR mirror image encompasses a whitelist configuration file of each item in the project of the board manager controller; and a data check is performed through the PFR mirror image in a case of running each item in the project of the board manager controller.

In some embodiments, the step that a compilation code configured to generate a PFR mirror image is executed in a case that the recognition result indicates that the compilation operation of the PFR project exists, so as to generate the PFR mirror image includes: a PFR signature mirror image is created in the compiled board manager controller project through a first signature tool; and the PFR signature mirror image is encrypted through a second signature tool, so as to obtain the PFR mirror image.

In some embodiments, the first signature tool is a PFR signature tool; and the step that a PFR signature mirror image is created in the compiled board manager controller project through a first signature tool includes: the first signature tool is added to a software catalog of the project of the board manager controller; a function for the PFR signature mirror image is created in the compilation script, and an original mirror image in an output catalog of the project and the whitelist configuration file of each item are copied into a catalog of the first signature tool in the software catalog according to the function; and the first signature tool is controlled to generate the PFR signature mirror image based on the original mirror image and the whitelist configuration file of each item, and the PFR signature mirror image is copied into the output catalog.

In some embodiments, the second signature tool is a signature encryption tool; and the step that the PFR signature mirror image is encrypted through a second signature tool, so as to obtain the PFR mirror image includes: the second signature tool is added to the software catalog; and a function for an encrypted signature mirror image is created in the compilation script, the second signature tool is invoked according to the function for the encrypted signature mirror image, and the second signature tool is controlled to generate the PFR mirror image based on the PFR signature mirror image in the output catalog.

In some embodiments, the step that the first signature tool is controlled to generate the PFR signature mirror image based on the original mirror image and the whitelist configuration file includes: the whitelist configuration file of each item is polled in a script of the first signature tool, a target address is mapped to the original mirror image according to an address offset value in partition information of the whitelist configuration file sequentially, and the whitelist configuration file is written into the target address in the original mirror image, so as to obtain the PFR signature mirror image, where the address offset value in the partition information is configured to indicate a position of the whitelist configuration file of the item in a flash memory of the board manager controller.

In some embodiments, the whitelist configuration file of each item encompasses bus whitelist information of the item and the partition information of the whitelist configuration file, where the partition information indicates partition information of the flash memory of the compiled board manager controller.

In some embodiments, the whitelist configuration file of each item is generated as follows: an item folder of each item is created in a creation catalog of the project of the board manager controller, and bus whitelist information of each item is stored in a corresponding item folder; and the item folder of each item is polled in a script configured to create the PFR signature mirror image, the whitelist configuration file is generated based on the bus whitelist information in each item folder, and the whitelist configuration file is stored in the output catalog of the project of the board manager controller.

In some embodiments, the partition information of the whitelist configuration file includes an occupied memory size value and the address offset value, and a memory size parameter is greater than or equal to a size of the whitelist configuration file; and the step that the whitelist configuration file of each item is polled in a script of the first signature tool includes: based on an address offset value of a current item, a position of a whitelist configuration file of the current item in the flash memory of the board manager controller is determined sequentially, and the whitelist configuration file of the current item is read based on the position in the flash memory, where the address offset value of the current item is determined by an address offset value of a previous item and an occupied memory size value of the current item.

In some embodiments, before the step that the whitelist configuration file of each item is polled in a script of the first signature tool, the method further includes: a free space in a partition of the flash memory is determined, and the whitelist configuration file of the item is stored in the free space, where the free space is determined by a size of the partition, an address offset value of the partition, and an address offset value of the free space.

In some embodiments, the macro definition indicates a macro definition of PFR; and the step that whether a compilation operation of a PFR project exists in a compilation script is recognized through a macro definition, so as to obtain a recognition result includes: it is determined that the compilation operation of the PFR project exists in a case of recognizing that the macro definition shows true; and it is determined that no compilation operation of the PFR project exists in a case of recognizing that the macro definition shows false.

In some embodiments, after the step that whether a compilation operation of a PFR project exists in a compilation script is generated through a macro definition in a case of compiling a project of a board manager controller, so as to obtain a recognition result, the method further includes: a compilation code configured to generate a general mirror image is executed in a case that the recognition result indicates that no compilation operation of the PFR project exists, so as to generate the general mirror image.

In some embodiments, a target compilation script is configured in the compilation script of the project of the board manager controller, the target compilation script invokes a first script to execute the compilation code configured to generate the PFR mirror image, and the target compilation script invokes a second script to execute the compilation code configured to generate the general mirror image.

In some embodiments, the method further includes: whether firmware of the PFR project exists is recognized through the macro definition in a process of refreshing firmware of the board manager controller; and in a case that the firmware of the PFR project exists, the firmware of the PFR project is refreshed.

In some embodiments, the step that in a case that the firmware of the PFR project exists, the firmware of the PFR project is refreshed includes: the firmware of the PFR project is refreshed through a target refresh tool, where the target refresh tool is a refresh tool configured for the firmware of the PFR project.

In some embodiments, the method further includes: whether the PFR project exists is recognized through the macro definition in a process of running the project of the board manager controller; and in a case that the PFR project exists, a version of firmware of the PFR project is displayed.

In some embodiments, the method further includes: a pre-activation stage is entered, a check is performed on a flash memory of the compiled board manager controller, and data in the flash memory are recovered through the PFR mirror image in a case that the check fails after a complex programmable logic device is activated.

In some embodiments, the method further includes: the complex programmable logic device controls the compiled board manager controller to enter the pre-activation stage in a case that the complex programmable logic device monitors that the compiled board manager controller sends a command other than the whitelist configuration file.

An apparatus is provided in a second aspect. The apparatus includes: a recognizing component configured to recognize whether a compilation operation of a PFR project exists in a compilation script through a macro definition in a case of compiling a project of a board manager controller, so as to obtain a recognition result, where the macro definition is a macro definition in a project configuration item file; a first executing component configured to execute a compilation code configured to generate a PFR mirror image in a case that the recognition result indicates that the compilation operation of the PFR project exists, so as to generate the PFR mirror image, where the PFR mirror image encompasses a whitelist configuration file of each item in the project of the board manager controller; and a running component configured to perform a data check through the PFR mirror image in a case of running each item in the project of the board manager controller.

A nonvolatile readable storage medium is further provided in a third aspect. The nonvolatile readable storage medium stores a computer program, where the computer program is configured to execute steps in any method described above when run.

An electronic device is further provided in a fourth aspect. The electronic device includes a memory and a processor; where the memory stores a computer program, and the processor is configured to execute steps in any method described above when running the computer program.

BRIEF DESCRIPTION OF THE DRAWINGS

FIG. 2 is a flowchart of a method for compiling a mirror image according to an embodiment of the disclosure;

FIG. 3 is a flowchart of mirror image compilation of an optional method for compiling a mirror image according to an embodiment of the disclosure;

DETAILED DESCRIPTION OF THE EMBODIMENTS

Embodiments of the disclosure will be described in detail below in conjunction with the accompanying drawings and the embodiments.

It should be noted that the terms "first", "second", etc. in the description, the claims, and the above accompanying drawings of the disclosure are used to distinguish between similar objects, instead of necessarily describing a particular sequence or a successive order.

Figure 1:
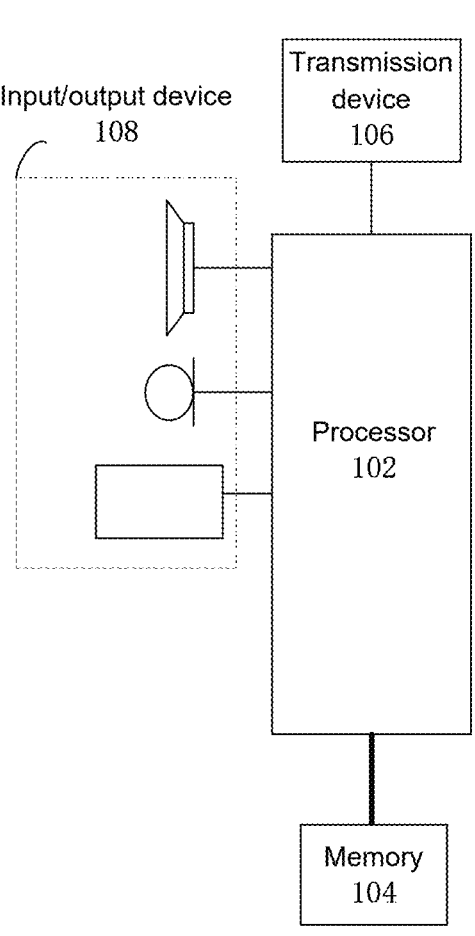
FIG. 1 is a structural block diagram of hardware of a mobile terminal of a method for compiling a mirror image according to an embodiment of the disclosure.

An embodiment of a method for compiling a mirror image according to the disclosure can be executed in a mobile terminal, a computer terminal, etc. With running on the mobile terminal as an embodiment, FIG. 1 is a structural block diagram of hardware of a mobile terminal of a method for compiling a mirror image according to an embodiment of the disclosure. As shown in FIG. 1, the mobile terminal can include one or more processors 102 (the processors 102 can include, but are not limited to, a microcontroller component (MCU), a field programmable gate array (FPGA), etc.) and a memory 104 configured to store data, where the above mobile terminal can further include a transmission device 106 configured as a communication function and an input/output device 108. Those of ordinary skill in the art can understand that the structure shown in FIG. 1 is merely illustrative, and does not limit the structure of the above mobile terminal. For example, the mobile terminal can further include more or fewer components than those shown in FIG. 1, or have a configuration different from that shown in FIG. 1.

The memory 104 can be configured to store a computer program, for example, a software program and a module of application software, such as a computer program corresponding to the method for compiling a mirror image according to the embodiments of the disclosure. The processor 102 runs the computer program stored in the memory 104, so as to execute various function applications and data processing, i.e. to implement the above method. The memory 104 can include a high-speed random memory, and can further include a nonvolatile memory, such as one or more magnetic storage apparatuses, flash memories, and other nonvolatile solid-state memories. In some instances, the memory 104 includes memories remotely configured relative to the processor 102. These remote memories can be connected to the mobile terminal via a network. Instances of the above network include, but are not limited to, the Internet, an intranet, a local area network, a mobile communication network, and their combinations.

The transmission device 106 is configured to receive or send data via one network. The optional instance of the above network can include a wireless network provided by a communication provider of the mobile terminal. In one instance, the transmission device 106 includes a network interface controller (NIC) that can be connected to other network devices through a base station, so as to communicate with the Internet. In one instance, the transmission device 106 can be a radio frequency (RF) module that is configured to communicate with the Internet wirelessly.

The embodiments of the disclosure can be run on a network architecture shown in FIG. 1. As shown in FIG. 1, the network architecture includes: a recognizing device, an executing device, and a running device. The recognizing device is configured to recognize whether a compilation operation of a platform firmware resilience (PFR) project exists; the executing device is configured to execute a compilation code configured to generate a PFR mirror image, so as to generate the PFR mirror image; and the running device is configured to perform a data check through the PFR mirror image in a case of running each item in a project of a board manager controller.

A method run on the mobile terminal is provided in the embodiment. FIG. 2 is a flowchart of a method for compiling a mirror image according to an embodiment of the disclosure. As shown in FIG. 2, the flow includes:

S202, whether a compilation operation of a PFR project exists in a compilation script is recognized through a macro definition in a case of compiling a project of a board manager controller, so as to obtain a recognition result, where the macro definition is a macro definition in a project configuration item file.

Optional, the board manager controller (BMC), a small operating system independent of a server system, is mainly responsible for core functions such as server hardware state management, remote server management, and operating system management, and operations such as monitoring, installing, and restarting. In a case of compiling the project of the board manager controller, a compilation operation of a general project and the compilation operation of the PFR project may exist. The PFR project indicates a project implemented through a platform firmware resilience Intel (Intel PFR) technology.

Since different projects require different mirror images to execute data checks in the work of compiling the board manager controller, it is necessary to determine whether the compilation code configured to execute the PFR project exists in a Python compilation script of the BMC project. In the embodiment, in the project of the board manager controller, the determination is made through a macro definition in the configuration item file (a PRJ file).

In some embodiments, in the method for compiling a mirror image according to the embodiments of the disclosure, the macro definition indicates a macro definition of PFR. The step that whether a compilation operation of a PFR project exists in a compilation script is recognized through a macro definition, so as to obtain a recognition result includes: it is determined that the compilation operation of the PFR project exists in a case of recognizing that the macro definition shows true; and it is determined that no compilation operation of the PFR project exists in a case of recognizing that the macro definition shows false.

In some embodiments, the macro definition of PFR, i.e. a PFR macro definition, indicates, for example, CONFig_SPX_FEATURE_INTEL_PFR_SUPPORT. Whether the compilation code configured to execute the PFR project exists is determined by determining whether the PFR macro definition exists in the compilation script. The recognition result may include "true" and "false". When the recognition result of the macro definition shows "true", it indicates that the compilation operation of the PFR project exists, otherwise when the macro definition shows "false", it indicates that no compilation operation of the PFR project exists in the script.

S204, a compilation code configured to generate a PFR mirror image is executed in a case that the recognition result indicates that a compilation operation of the PFR project exists, so as to generate the PFR mirror image, where the PFR mirror image encompasses a whitelist configuration file of each item in the project of the board manager controller.

In some embodiments, if the compilation operation of the PFR project exists in the project of the board manager controller, the compilation code configured to generate the PFR mirror image starts to be executed, so as to generate the PFR mirror image. The mirror image, a type of redundancy, indicates a file storage form. In other words, data on one magnetic disk has a completely identical copy on another magnetic disk.

S206, a data check is performed through the PFR mirror image in a case of running each item in the project of the board manager controller.

Since the PFR technology uses a programmable logic device as the core of the entire PFR technology, in the embodiment, a security activation check, data management, etc. are performed through the PFR mirror image of the BMC under the control of the programmable logic device. Thus, security management of an entire platform is achieved.

In some embodiments, the project of the board manager controller includes a plurality of items. In a case of running each item, in order to achieve the security management of each item and the project, it is required to ensure normal operation of firmware through the PFR mirror image.

Through the above steps, problems that it is difficult to generate the PFR mirror image and check the BMC owing to difficulties in unifying compilation codes of the general technology and compilation codes of the PFR technology are solved. Thus, the PFR mirror image is generated in the BMC project, and the data check is performed through the PFR mirror image.

In some embodiments, in the method for compiling a mirror image according to the embodiments of the disclosure, the step that a compilation code configured to generate a PFR mirror image is executed in a case that the recognition result indicates that a compilation operation of the PFR project exists, so as to generate the PFR mirror image includes: a PFR signature mirror image is created in the compiled board manager controller project through a first signature tool; and the PFR signature mirror image is encrypted through a second signature tool, so as to obtain the PFR mirror image.

In some embodiments, FIG. 3 is a flowchart of mirror image compilation of an optional method for compiling a mirror image according to an embodiment of the disclosure. As shown in FIG. 3, after a whitelist configuration file of the project is generated, the PFR mirror image is generated through the first signature tool and the second signature tool. The first signature tool indicates a signature tool of the PFR technology, referred to as a PFR signature tool for short. In other words, the first signature tool, a type of tool configured to generate a new mirror image for an original mirror image of the board manager controller, is configured to create the PFR signature mirror image through the original mirror image in the project of the board manager controller and the whitelist configuration file of the item. The second signature tool is configured to encrypt the PFR signature mirror image generated through the first signature tool, so as to obtain the PFR mirror image.

In some embodiments, in the method for compiling a mirror image according to the embodiments of the disclosure, the first signature tool is the PFR signature tool. The step that a PFR signature mirror image is created in the compiled board manager controller project through a first signature tool includes: the first signature tool is added to a software catalog of the project of the board manager controller; a function for the PFR signature mirror image is created in the compilation script, and an original mirror image in an output catalog of the project and the whitelist configuration file of each item are copied into a catalog of the first signature tool in the software catalog according to the function; and the first signature tool is controlled to generate the PFR signature mirror image based on the original mirror image and the whitelist configuration file of each item, and the PFR signature mirror image is copied into the output catalog.

In some embodiments, the first signature tool indicates the signature tool of the PFR technology. Before the first signature tool is invoked, the first signature tool is required to be added to the software catalog of codes of the project of the board manager controller, and the function for creating the PFR signature mirror image is required to be added to the compilation code. Through the operation, the signature tool can be invoked to generate the signature mirror image randomly. The original mirror image in the output catalog in the project of the board manager controller, the whitelist configuration file named by each item, and an item folder are copied into a relevant catalog of the first signature tool according to the function. A command of creating the signature mirror image is executed. The PFR signature mirror image of the corresponding item is generated through the original mirror image and the whitelist configuration file named by each item. The signature mirror image of each item is copied into the output catalog.

In some embodiments, in the method for compiling a mirror image according to the embodiments of the disclosure, the second signature tool is a signature encryption tool. The step that the PFR signature mirror image is encrypted through a second signature tool, so as to obtain the PFR mirror image includes: the second signature tool is added to the software catalog; and a function for an encrypted signature mirror image is created in the compilation script, the second signature tool is invoked according to the function for the encrypted signature mirror image, and the second signature tool is controlled to generate the PFR mirror image based on the PFR signature mirror image in the output catalog.

In some embodiments, the second signature tool is configured to encrypt the PFR signature mirror image generated through the first signature tool. Before an encryption operation, the second signature tool is required to be added to the software catalog of the codes of the project of the board manager controller for subsequent invocation. After addition, the function for creating an encrypted PFR signature mirror image is added to the compilation code. The second signature tool is invoked according to the function, so as to encrypt and fill the PFR signature mirror image generated through the first signature tool, and thus an encrypted PFR mirror image of the corresponding item is obtained. For example, the second signature tool may be a high precision metering (HPM) signature tool configured to encrypt the PFR signature mirror image, so as to generate an encrypted HPM mirror image.

In some embodiments, in the method for compiling a mirror image according to the embodiments of the disclosure, the step that the first signature tool is controlled to generate the PFR signature mirror image based on the original mirror image and the whitelist configuration file includes: the whitelist configuration file of each item is polled in a script of the first signature tool; a target address is mapped to the original mirror image according to an address offset value in partition information of the whitelist configuration file sequentially; and the whitelist configuration file is written into the target address in the original mirror image, so as to obtain the PFR signature mirror image. The address offset value in the partition information is configured to indicate a position of the whitelist configuration file of the item in a flash memory of the board manager controller.

In some embodiments, the original mirror image indicates that data in its partition are empty and required to be generated through the first signature tool and written into a corresponding partition position. The first signature tool is placed in the software catalog of the codes of the project of the board manager controller. The whitelist configuration file of each item in the project of the board manager controller is polled through the signature tool. According to the target address in the original mirror image stored in the partition of the whitelist configuration file, i.e. the address offset value, the whitelist configuration file is written into the target address in the original mirror image, so as to obtain the PFR signature mirror image.

For example, pfr_manifest.json files for items A, B, C, and D are written into address positions 0x3fc0000, 0x3fb0000, 0x3fa0000, and 0x3f90000 of the mirror image sequentially.

In some embodiments, in the method for compiling a mirror image according to the embodiments of the disclosure, the whitelist configuration file of each item encompasses bus whitelist information of the item and the partition information of the whitelist configuration file, where the partition information indicates partition information of the flash memory of the compiled board manager controller.

In some embodiments, the partition information may encompass size information and offset information. The bus whitelist information of each item and the partition information of the flash memory of the compiled board manager controller, i.e. the partition information, are stored in the corresponding whitelist configuration file named by each item. The whitelist configuration files of all the items are placed in different addresses of the partition according to the offset information.

In some embodiments, in the method for compiling a mirror image according to the embodiments of the disclosure, the whitelist configuration file of each item is generated as follows: an item folder of each item is created in a creation catalog of the project of the board manager controller, and bus whitelist information of each item is stored in a corresponding item folder; and the item folder of each item is polled in a script configured to create the PFR signature mirror image, the whitelist configuration file is generated based on the bus whitelist information in each item folder, and the whitelist configuration file is stored in the output catalog of the project of the board manager controller.

In some embodiments, a folder named by an item name is created in the creation catalog of the project of the board manager controller, and the bus whitelist file information of the corresponding item is placed in the corresponding folder. The item folder of each item is polled in the script of the project, the whitelist configuration file of the corresponding item is generated through the bus whitelist file information in the folder, and the whitelist configuration file is stored in a folder named by a corresponding item name. For example, the bus whitelist file information may be an inter-integrated circuit (I2C) whitelist file pfr_smbus_rules.json, and the whitelist configuration file of the corresponding item may be pfr_manifest.json.

In some embodiments, in the method for compiling a mirror image according to the embodiments of the disclosure, the partition information of the whitelist configuration file includes an occupied memory size value and the address offset value, and a memory size parameter is greater than or equal to a size of the whitelist configuration file. The step that the whitelist configuration file of each item is polled in a script of the first signature tool includes: based on an address offset value of a current item, a position of a whitelist configuration file of the current item in the flash memory of the board manager controller is determined sequentially, and the whitelist configuration file of the current item is read based on the position in the flash memory, where the address offset value of the current item is determined by an address offset value of a previous item and an occupied memory size value of the current item.

Figure 4:
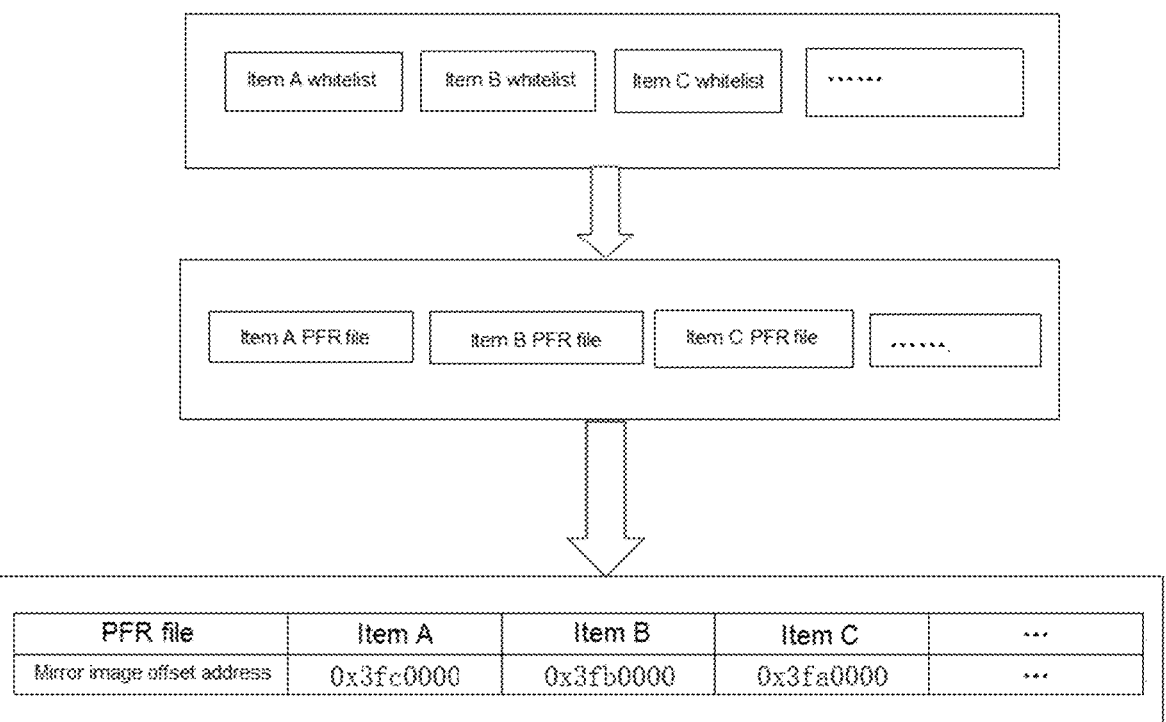
FIG. 4 is a schematic diagram of a mapping relation between a whitelist file of an item and a mirror image according to an embodiment of the disclosure.

In some embodiments, the partition information in the whitelist configuration file includes the memory size parameter and an initial address offset value. The programmable logic device may check a mirror image of the firmware and important data in a process of activating and refreshing the board manager controller according to this information. The memory size parameter is configured to indicate a memory size of the file or partition. For example, it can be set to 0x10000 (64 K bytes). When the memory size of the partition is less than that of the whitelist configuration file, the whitelist configuration file cannot be placed in the partition. Thus, the memory size parameter of the partition is required to be greater than or equal to the size of the whitelist configuration file. The address offset value is configured to indicate a position of relevant information or configuration file in the corresponding configuration file or partition. FIG. 4 is a schematic diagram of a mapping relation between a whitelist file of the item and a mirror image according to an embodiment of the disclosure. As shown in FIG. 4, based on the address offset value of each item, the position of the whitelist configuration file corresponding to the current item in the flash memory of the board manager controller may be determined, and the whitelist configuration file may be read.

It should be noted that the memory size parameter can be set randomly, but the address offset value of the current item is required to be determined through the address offset value of the previous item relative to an address of the item. In some embodiments, the address offset value of the current item is obtained by subtracting the memory size parameter of the previous item from the address offset value of the previous item. For example, there are three items with an identical memory size, i.e. an item A, an item B, and an item C in the project of the board manager controller in total. The memory size parameter of the three items is set to 64 K, i.e. 0x10000. When 0x3fc0000 denotes an address offset value of the item A, 0x3fc0000-0x10000, i.e. 0x3fb0000 denotes an address offset value of the item B, and 0x3fb0000-0x10000, i.e. 0x3fa0000 denotes an address offset value of the item C.

In some embodiments, in the method for compiling a mirror image according to the embodiments of the disclosure, before the step that the whitelist configuration file of each item is polled in a script of the first signature tool, the method further includes: a free space in a partition of the flash memory is determined, and the whitelist configuration file of the item is stored in the free space, where the free space is determined by a size of the partition, an address offset value of the partition, and an address offset value of the free space.

In some embodiments, before the memory size parameter of the whitelist configuration file and the address offset value are determined, it is required to determine the memory size parameter of the partition and a memory size parameter of the free space in the partition. Thus, a whitelist configuration file of a new item can be stored. In some embodiments, the memory size parameter of the partition is required to be able to accommodate whitelist configuration files of a sufficient number of items. For example, when 64 K denotes the memory size parameter of the whitelist configuration files of all items, and 32 items need to be placed in the partition, the memory size parameter of the partition needs to be set to 2 M.

The memory size parameter of the free space in the flash partition is calculated through the size of the partition, the address offset value of the partition, and the address offset value of the free space. In some embodiments, the flash partition encompasses partition space occupied by an item file and remaining free space. A memory size of the free space is a difference between an ultimate offset value of the partition space occupied by the item file and an initial offset value of the free space. The memory size parameter of the free space can be obtained by subtracting a difference between the two values from the memory size parameter of the partition space occupied by the item file.

In some embodiments, in the method for compiling a mirror image according to the embodiments of the disclosure, after the step that whether a compilation operation of a PFR project exists in a compilation script is recognized through a macro definition in a case of compiling a project of a board manager controller, so as to obtain a recognition result, the method further includes: a compilation code configured to generate a general mirror image is executed in a case that the recognition result indicates that no compilation operation of the PFR project exists, so as to generate the general mirror image.

In some embodiments, when the recognition result of the PFR macro definition shows "false", it indicates that the compilation operation of the PFR project exists, and the compilation code configured to generate the PFR mirror image is executed based on the project of the board manager controller, so as to generate the general mirror image.

In some embodiments, in the method for compiling a mirror image according to the embodiments of the disclosure, a target compilation script is configured in the compilation script of the project of the board manager controller, the target compilation script invokes a first script to execute the compilation code configured to generate the PFR mirror image, and the target compilation script invokes a second script to execute the compilation code configured to generate the general mirror image.

In some embodiments, a first code is a second compilation code configured to generate the PFR mirror image, a second code is the compilation code configured to generate the general mirror image, and an automatic compilation Python script of a PFRBMC project is added. When the recognition result of the macro definition shows "true", it indicates that the compilation operation of the PFR project exists, and the automatic compilation Python script invokes an automatic compilation script of a general BMC, so as to execute the first compilation code configured to generate the PFR mirror image. When the recognition result shows "false", the automatic compilation Python script invokes the automatic compilation script of the PFRBMC, so as to execute the compilation code configured to generate the general mirror image. Thus, the general BMC mirror image and the PFRBMC mirror image can be generated simultaneously by performing automatic compilation once.

In some embodiments, the method for compiling a mirror image according to the embodiments of the disclosure further includes: whether firmware of the PFR project exists is recognized through the macro definition in a process of refreshing firmware of the board manager controller; and in a case that the firmware of the PFR project exists, the firmware of the PFR project is refreshed.

In some embodiments, in a process of running the project of the board manager controller, whether the compilation code configured to execute the PFR project exists is determined through the PFR macro definition in the item file, and moreover, whether the firmware of the PFR project exists is recognized through the PFR macro definition. When the recognition result indicates that the firmware of the PFR project exists, and in other words, when the PFR macro definition shows "true", the firmware of the PFR project is refreshed.

In some embodiments, in the method for compiling a mirror image according to the embodiments of the disclosure, the step that in a case that the firmware of the PFR project exists, the firmware of the PFR project is refreshed includes: the firmware of the PFR project is refreshed through a target refresh tool, where the target refresh tool is a refresh tool for the firmware of the PFR project.

In some embodiments, when the PFR macro definition shows "true", it indicates that the firmware of the PFR project exists, and the firmware of the PFR project is refreshed. During refresh, the firmware of the PFR project is refreshed through a corresponding refresh tool.

In some embodiments, the method for compiling a mirror image according to the embodiments of the disclosure further includes: whether the PFR project exists is recognized through the macro definition in a process of running the project of the board manager controller; and in a case that the PFR project exists, a version of the firmware of the PFR project is displayed.

In some embodiments, in the process of running the project of the board manager controller, whether the compilation code configured to execute the PFR project exists is recognized and determined through the PFR macro definition in the item file. When the recognition result shows that the compilation code configured to execute the PFR project exists, and in other words, when the PFR macro definition shows "true", the version of the firmware of the PFR project is displayed, so as to refresh a web page with a version number displayed.

In some embodiments, the method for compiling a mirror image according to the embodiments of the disclosure further includes: a pre-activation stage is entered, a check is performed on a flash memory of the compiled board manager controller, and data in the flash memory are recovered through the PFR mirror image in a case that the check fails after a complex programmable logic device is activated.

In some embodiments, the PFR technology can be run in two stages, i.e. the pre-activation stage and a normal activation mode stage. After the system is energized, the PFR technology enters the pre-activation stage at first. In this case, all other firmware having interfaces possibly to be activated are in a reset state. The firmware may include a central processing component, the board manager controller, etc. After activated, the complex programmable logic device performs a check on the flash memory of the compiled board manager controller.

When a check result shows a success, the PFR technology enters the normal activation mode stage. During running in the stage, the programmable logic device is mainly responsible for monitoring a critical activation device and ensuring that device booting succeeds within assigned time. In a case of booting timeout, the programmable logic device skips to the pre-activation state, so as to perform a data recovery operation. In a case of monitoring the activation device, an operation of the board manager controller on the flash memory, a hardware bus, etc. may be monitored.

When a check result shows a failure, the programmable logic device erases a flash memory region that does not pass the check, and recovers the data in the flash memory through the PFR mirror image file.

In some embodiments, the method for compiling a mirror image according to the embodiments of the disclosure further includes: the complex programmable logic device controls the compiled board manager controller to enter the pre-activation stage in a case that the complex programmable logic device monitors that the compiled board manager controller sends a command other than the whitelist configuration file.

In some embodiments, in the PFR technology, the programmable logic device monitors the hardware of the board manager controller in the normal activation mode stage, filters hardware bus data, and monitors whether the board manager controller sends the command other than a whitelist. The board manager controller provides the corresponding whitelist file for the programmable logic device. When the programmable logic device monitors that the compiled board manager controller sends the command other than the whitelist configuration file, it indicates that a compilation risk is probably caused. The programmable logic device controls the compiled board manager controller to enter the pre-activation stage, and perform the data check in the pre-activation stage.

Through the description of the above embodiments, those skilled in the art can clearly understand that the method according to the above embodiments can be implemented by means of software and a necessary general hardware platform, or can be certainly implemented through hardware. However, the former is a preferred embodiment in many cases. Based on such understanding, the technical solution in essence of the disclosure or the part that contributes to the related art can be embodied in the form of software products. The computer software product is stored in a nonvolatile readable storage medium (such as a read-only memory (ROM)/a random access memory (RAM), a magnetic disk, and an optical disk), and includes several instructions to make one terminal device (such as a mobile phone, a computer, a server, and a network device) execute the method in each embodiment of the disclosure.

An apparatus is further provided in the embodiment. The apparatus is configured to implement the above embodiments and optional embodiments, the repetitions of which will not be described in detail herein. As used below, the term "module" can be a combination of software and/or hardware that implements predetermined functions. While the apparatus described in the following embodiment is preferably implemented through software, it is possible to conceive that the apparatus is implemented through hardware or a combination of the software and the hardware.

Figure 5:
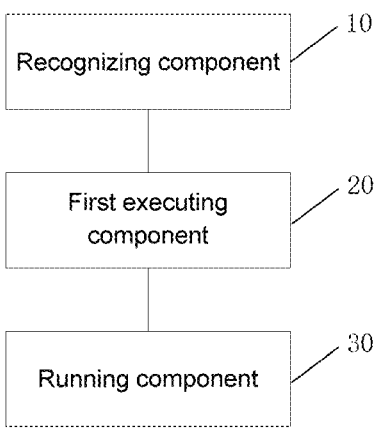
FIG. 5 is a structural block diagram of an apparatus for compiling a mirror image according to an embodiment of the disclosure.

FIG. 5 is a structural block diagram of an apparatus for compiling a mirror image according to an embodiment of the disclosure. As shown in FIG. 5, the apparatus includes a recognizing component 10, a first executing component 20, and a running component 30.

The recognizing component 10 is configured to recognize whether a compilation operation of a PFR project exists in a compilation script through a macro definition in a case of compiling a project of a board manager controller, so as to obtain a recognition result, where the macro definition is a macro definition in a project configuration item file.

The first executing component 20 is configured to execute a compilation code configured to generate a PFR mirror image in a case that the recognition result indicates that the compilation operation of the PFR project exists, so as to generate the PFR mirror image, where the PFR mirror image encompasses a whitelist configuration file of each item in the project of the board manager controller.

The running component 30 is configured to perform a data check through the PFR mirror image in a case of running each item in the project of the board manager controller.

In some embodiments, in the apparatus for compiling a mirror image according to the embodiments of the disclosure, the first executing component 20 includes: a first creating module configured to create a PFR signature mirror image in the compiled board manager controller project through a first signature tool; and an encrypting module configured to encrypt the PFR signature mirror image through a second signature tool, so as to obtain the PFR mirror image.

In some embodiments, in the apparatus for compiling a mirror image according to the embodiments of the disclosure, the first executing component 20 includes: a first adding module configured to add the first signature tool to a software catalog of the project of the board manager controller; a second creating module configured to create a function for the PFR signature mirror image in the compilation script, and copy an original mirror image in an output catalog of the project and the whitelist configuration file of each item into a catalog of the first signature tool in the software catalog according to the function; and a controlling module configured to control the first signature tool to generate the PFR signature mirror image based on the original mirror image and the whitelist configuration file of each item, and copy the PFR signature mirror image into the output catalog.

In some embodiments, in the apparatus for compiling a mirror image according to the embodiments of the disclosure, the first executing component 20 includes: a second adding module configured to add the second signature tool to the software catalog; and a third creating module configured to create a function for an encrypted signature mirror image in the compilation script, invoke the second signature tool according to the function for the encrypted signature mirror image, and control the second signature tool to generate the PFR mirror image based on the PFR signature mirror image in the output catalog.

In some embodiments, in the apparatus for compiling a mirror image according to the embodiments of the disclosure, the first executing component 20 includes: a first polling module configured to poll the whitelist configuration file of each item in a script of the first signature tool, map a target address to the original mirror image according to an address offset value in partition information of the whitelist configuration file sequentially, and write the whitelist configuration file into the target address in the original mirror image, so as to obtain the PFR signature mirror image, where the address offset value in the partition information is configured to indicate a position of the whitelist configuration file of the item in a flash memory of the board manager controller.

In some embodiments, in the apparatus for compiling a mirror image according to the embodiments of the disclosure, an encompassing module is configured as follows: the whitelist configuration file of each item encompasses bus whitelist information of the item and the partition information of the whitelist configuration file, where the partition information indicates partition information of the flash memory of the compiled board manager controller.

In some embodiments, the apparatus for compiling a mirror image according to the embodiments of the disclosure includes: a fourth creating module configured to create an item folder of each item in a creation catalog of the project of the board manager controller, and store bus whitelist information of each item in a corresponding item folder; and a second polling module configured to poll the item folder of each item in a script configured to create the PFR signature mirror image, generate the whitelist configuration file based on the bus whitelist information in each item folder, and store the whitelist configuration file in the output catalog of the project of the board manager controller.

In some embodiments, in the apparatus for compiling a mirror image according to the embodiments of the disclosure, the first executing component 20 includes: a first determining module configured to determine, based on an address offset value of a current item, a position of a whitelist configuration file of the current item in the flash memory of the board manager controller sequentially, and read the whitelist configuration file of the current item based on the position in the flash memory, where the address offset value of the current item is determined by an address offset value of a previous item and an occupied memory size value of the current item.

In some embodiments, the apparatus for compiling a mirror image according to the embodiments of the disclosure includes: a determining component. Before the whitelist configuration file of each item is polled in the script of the first signature tool, the determining component is configured to determine a free space in a partition of the flash memory, and store the whitelist configuration file of the item in the free space, where the free space is determined by a size of the partition, an address offset value of the partition, and an address offset value of the free space.

In some embodiments, in the apparatus for compiling a mirror image according to the embodiments of the disclosure, the recognizing component 10 includes: a second determining module configured to determine that the compilation operation of the PFR project exists in a case of recognizing that the macro definition shows true; and a third determining module configured to determine that no compilation operation of the PFR project exists in a case of recognizing that the macro definition shows false.

In some embodiments, the apparatus for compiling a mirror image according to the embodiments of the disclosure further includes: a second executing component. After whether the compilation operation of the PFR project exists in the compilation script is recognized through the macro definition in a case of compiling the project of the board manager controller, so as to obtain the recognition result, the second determining component is configured to execute a compilation code configured to generate a general mirror image in a case that the recognition result indicates that no compilation operation of the PFR project exists, so as to generate the general mirror image.

In some embodiments, the apparatus for compiling a mirror image according to the embodiments of the disclosure includes: a configuration module configured as follows: a target compilation script is configured in the compilation script of the project of the board manager controller, where the target compilation script invokes a first script to execute the compilation code configured to generate the PFR mirror image, and the target compilation script invokes a second script to execute the compilation code configured to generate the general mirror image.

In some embodiments, in the apparatus for compiling a mirror image according to the embodiments of the disclosure, the recognizing component 10 includes: a first recognizing module configured to recognize whether firmware of the PFR project exists through the macro definition in a process of refreshing firmware of the board manager controller; and a first refreshing module configured to refresh, in a case that the firmware of the PFR project exists, the firmware of the PFR project.

In some embodiments, in the apparatus for compiling a mirror image according to the embodiments of the disclosure, the recognizing component 10 includes: a second refreshing module configured to refresh the firmware of the PFR project through a target refresh tool, where the target refresh tool is a refresh tool configured for the firmware of the PFR project.

In some embodiments, in the apparatus for compiling a mirror image according to the embodiments of the disclosure, the recognizing component 10 further includes: a second recognizing module configured to recognize whether the PFR project exists through the macro definition in a process of running the project of the board manager controller; and a displaying module configured to display, in a case that the PFR project exists, a version of firmware of the PFR project.

In some embodiments, in the apparatus for compiling a mirror image according to the embodiments of the disclosure, the running component 30 includes: a checking module configured to enter a pre-activation stage, perform a check on a flash memory of the compiled board manager controller, and recover data in the flash memory through the PFR mirror image in a case that the check fails after a complex programmable logic device is activated.

In some embodiments, in the apparatus for compiling a mirror image according to the embodiments of the disclosure, the running component 30 includes: a monitor module configured to control, by the complex programmable logic device, the compiled board manager controller to enter the pre-activation stage in a case that the complex programmable logic device monitors that the compiled board manager controller sends a command other than the whitelist configuration file.

It should be noted that all the modules can be implemented through software or hardware. In the latter case, the modules are positioned in a same processor, or all the modules are positioned in different processors in any combination form, which is not restrictive.

A nonvolatile readable storage medium is further provided in the embodiments of the disclosure. The nonvolatile readable storage medium stores a computer program, where the computer program is configured to execute steps in any method described above when run.

In some embodiment, the above nonvolatile readable storage medium may include, but is not limited to, various nonvolatile readable storage media capable of storing a computer program, such as a universal serial bus (USB) flash disk, a read-only memory (ROM), a random access memory (RAM), a mobile hard disk, a magnetic disk, and an optical disk.

An electronic device is further provided in the embodiments of the disclosure. The electronic device includes a memory and a processor; where the memory stores a computer program, and the processor is configured to execute steps in any method described above when running the computer program.

In some embodiment, the above electronic device may further include a transmission device and an input/output device; where the transmission device is connected to the above processor, and the input/output device is connected to the above processor.

Reference can be made to the instances described in the above embodiments and the illustrative embodiments for optional instances in the embodiment, which will not be repeated herein in the embodiment.

Apparently, those skilled in the art should understand that all the modules or steps of the disclosure can be implemented through a general-purpose computation apparatus, centralized on a single computation apparatus or distributed over a network composed of a plurality of computation apparatuses, and implemented through program codes executable by the computation apparatus. Thus, the modules or steps can be stored in a storage apparatus to be executed by the computation apparatus. In some cases, the steps shown or described can be executed in orders other than those herein or fabricated into individual integrated circuit modules. Alternatively, some or all of the modules or the steps can be implemented by fabricating them into individual integrated circuit modules separately. In this way, the disclosure is not limited to any particular combination of hardware and software.

What are described above is merely optional embodiments of the disclosure, and is not intended to limit the disclosure. Those skilled in the art can make various changes and variations to the disclosure. Any modifications, equivalent replacements, improvements, etc. made within the principles of the disclosure should fall within the scope of protection of the disclosure.

What is claimed is:

1. A method for compiling a mirror image, comprising:
recognizing whether a compilation operation of a platform firmware resilience (PFR) project exists in a compilation script through a macro definition in a case of compiling a project of a board manager controller, so as to obtain a recognition result, wherein the macro definition is a macro definition in a project configuration item file;
executing a compilation code configured to generate a PFR mirror image in a case that the recognition result indicates that the compilation operation of the PFR project exists, so as to generate the PFR mirror image, wherein the PFR mirror image comprises a whitelist configuration file of each item in the project of the board manager controller; and
performing a data check through the PFR mirror image in a case of running each item in the project of the board manager controller,
wherein executing the compilation code configured to generate the PFR mirror image in the case that the recognition result indicates that the compilation operation of the PFR project exists, so as to generate the PFR mirror image comprises:
creating a PFR signature mirror image in the board manager controller project through a first signature tool; and
encrypting the PFR signature mirror image through a second signature tool, so as to obtain the PFR mirror image.
2. The method according to claim 1, wherein the first signature tool is a PFR signature tool; and creating the PFR signature mirror image in the compiled board manager controller project through the first signature tool comprises:
adding the first signature tool to a software catalog of the project of the board manager controller;

creating a function for the PFR signature mirror image in the compilation script, and copying an original mirror image in an output catalog of the project and the whitelist configuration file of each item into a catalog of the first signature tool in the software catalog according to the function; and
controlling the first signature tool to generate the PFR signature mirror image based on the original mirror image and the whitelist configuration file of each item, and copying the PFR signature mirror image into the output catalog.
3. The method according to claim 2, wherein the second signature tool is a signature encryption tool; and encrypting the PFR signature mirror image through the second signature tool, so as to obtain the PFR mirror image comprises:
adding the second signature tool to the software catalog; and
creating a function for an encrypted signature mirror image in the compilation script, invoking the second signature tool according to the function for the encrypted signature mirror image, and controlling the second signature tool to generate the PFR mirror image based on the PFR signature mirror image in the output catalog.
4. The method according to claim 2, wherein controlling the first signature tool to generate the PFR signature mirror image based on the original mirror image and the whitelist configuration file comprises:
polling the whitelist configuration file of each item in a script of the first signature tool, mapping a target address to the original mirror image according to an address offset value in partition information of the whitelist configuration file sequentially, and writing the whitelist configuration file into the target address in the original mirror image, so as to obtain the PFR signature mirror image, wherein the address offset value in the partition information is configured to indicate a position of the whitelist configuration file of the item in a flash memory of the board manager controller.
5. The method according to claim 4, wherein the whitelist configuration file of each item comprises bus whitelist information of the item and the partition information of the whitelist configuration file, and the partition information indicates partition information of the flash memory of the compiled board manager controller.
6. The method according to claim 5, wherein the whitelist configuration file of each item is generated as follows:
creating an item folder of each item in a creation catalog of the project of the board manager controller, and storing bus whitelist information of each item in a corresponding item folder; and
polling the item folder of each item in a script configured to create the PFR signature mirror image, generating the whitelist configuration file based on the bus whitelist information in each item folder, and storing the whitelist configuration file in the output catalog of the project of the board manager controller.
7. The method according to claim 6, wherein the partition information of the whitelist configuration file comprises an occupied memory size value and the address offset value, and a memory size parameter is greater than or equal to a size of the whitelist configuration file; and polling the whitelist configuration file of the each item in the script of the first signature tool comprises:
determining, based on an address offset value of a current item, a position of a whitelist configuration file of the current item in the flash memory of the board manager controller sequentially, and reading the whitelist configuration file of the current item based on the position in the flash memory, wherein the address offset value of the current item is determined by an address offset value of a previous item and an occupied memory size value of the current item.

8. The method according to claim 4, wherein before polling the whitelist configuration file of the each item in the script of the first signature tool, the method further comprises:

determining a free space in a partition of the flash memory, and storing the whitelist configuration file of the item in the free space, wherein the free space is determined by a size of the partition, an address offset value of the partition, and an address offset value of the free space.

9. The method according to claim 1, wherein the macro definition indicates a macro definition of PFR; and recognizing whether the compilation operation of the PFR project exists in the compilation script through the macro definition, so as to obtain the recognition result comprises:

determining that the compilation operation of the PFR project exists in a case of recognizing that the macro definition shows true; and determining that no compilation operation of the PFR project exists in a case of recognizing that the macro definition shows false.

10. The method according to claim 1, wherein after recognizing whether the compilation operation of the PFR project exists in the compilation script through the macro definition in the case of compiling the project of the board manager controller, so as to obtain the recognition result, the method further comprises:

executing a compilation code configured to generate a general mirror image in a case that the recognition result indicates that no compilation operation of the PFR project exists, so as to generate the general mirror image.

11. The method according to claim 10, wherein a target compilation script is configured in the compilation script of the project of the board manager controller, the target compilation script invokes a first script to execute the compilation code configured to generate the PFR mirror image, and the target compilation script invokes a second script to execute the compilation code configured to generate the general mirror image.

12. The method according to claim 1, further comprising:

recognizing whether firmware of the PFR project exists through the macro definition in a process of refreshing firmware of the board manager controller; and refreshing, in a case that the firmware of the PFR project exists, the firmware of the PFR project.

13. The method according to claim 12, wherein refreshing, in the case that the firmware of the PFR project exists, the firmware of the PFR project comprises:

refreshing the firmware of the PFR project through a target refresh tool, wherein the target refresh tool is a refresh tool configured for the firmware of the PFR project.

14. The method according to claim 1, further comprising:

recognizing whether the PFR project exists through the macro definition in a process of running the project of the board manager controller; and displaying, in a case that the PFR project exists, a version of firmware of the PFR project.

15. The method according to claim 1, further comprising:

entering a pre-activation stage, performing a check on a flash memory of the compiled board manager controller, and recovering data in the flash memory through the PFR mirror image in a case that the check fails after a complex programmable logic device is activated.

16. The method according to claim 15, further comprising:

controlling, by the complex programmable logic device, the compiled board manager controller to enter the pre-activation stage in a case that the complex programmable logic device monitors that the compiled board manager controller sends a command other than the whitelist configuration file.

17. The method according to claim 5, wherein the partition information comprises size information and offset information, and the bus whitelist information of the each item and the partition information of the flash memory of the compiled board manager controller are stored in a corresponding whitelist configuration file named by the each item, and whitelist configuration files of all the items are placed in different addresses of the partition information according to the offset information.

18. A nonvolatile readable storage medium, storing a computer program, wherein the computer program, when executed by a processor, implements to:

recognize whether a compilation operation of a platform firmware resilience (PFR) project exists in a compilation script through a macro definition in a case of compiling a project of a board manager controller, so as to obtain a recognition result, wherein the macro definition is a macro definition in a project configuration item file;

execute a compilation code configured to generate a PFR mirror image in a case that the recognition result indicates that the compilation operation of the PFR project exists, so as to generate the PFR mirror image, wherein the PFR mirror image comprises a whitelist configuration file of each item in the project of the board manager controller; and perform a data check through the PFR mirror image in a case of running each item in the project of the board manager controller, wherein executing the compilation code configured to generate the PFR mirror image in the case that the recognition result indicates that the compilation operation of the PFR project exists, so as to generate the PFR mirror image comprises:

creating a PFR signature mirror image in the board manager controller project through a first signature tool; and encrypting the PFR signature mirror image through a second signature tool, so as to obtain the PFR mirror image.

19. An electronic device, comprising a memory, a processor, and a computer program stored in the memory and runnable in the processor, wherein the processor, when executing the computer program, implements to:

recognize whether a compilation operation of a platform firmware resilience (PFR) project exists in a compilation script through a macro definition in a case of compiling a project of a board manager controller, so as to obtain a recognition result, wherein the macro definition is a macro definition in a project configuration item file;

execute a compilation code configured to generate a PFR mirror image in a case that the recognition result indicates that the compilation operation of the PFR project exists, so as to generate the PFR mirror image, wherein the PFR mirror image comprises a whitelist configuration file of each item in the project of the board manager controller; and perform a data check through the PFR mirror image in a case of running each item in the project of the board manager controller, wherein executing the compilation code configured to generate the PFR mirror image in the case that the recognition result indicates that the compilation operation of the PFR project exists, so as to generate the PFR mirror image comprises:

creating a PFR signature mirror image in the board manager controller project through a first signature tool; and encrypting the PFR signature mirror image through a second signature tool, so as to obtain the PFR mirror image.

\* \* \* \* \*